United States Patent [19]
Kern

[11] 3,920,072
[45] Nov. 18, 1975

[54] METHOD OF PRODUCING OIL FROM A SUBTERRANEAN FORMATION

[75] Inventor: Loyd R. Kern, Irving, Tex.

[73] Assignee: Atlantic Richfield Company, Los Angeles, Calif.

[22] Filed: June 24, 1974

[21] Appl. No.: 482,156

[52] U.S. Cl. .............................. 166/248; 166/30
[51] Int. Cl.² ........................................ E21B 43/24
[58] Field of Search ...... 166/248, DIG. 1, 272, 302, 166/314, 247

[56] References Cited
UNITED STATES PATENTS

| | | | |
|---|---|---|---|
| 3,627,047 | 12/1971 | Wilson | 166/DIG. 1 X |
| 3,757,860 | 9/1973 | Pritchett | 166/248 |
| 3,766,980 | 10/1973 | Kern | 166/248 |

Primary Examiner—Stephen J. Novosad
Attorney, Agent, or Firm—James C. Fails

[57] ABSTRACT

Method of increasing the oil producing rate from a subterranean formation containing solid gas hydrates, characterized by heating the formation by passing electrical current therethrough. Also disclosed are specific apparatus, elements and method steps employed in performing the invention in an oil and hydrate-containing subterranean formation; and particular applications and advantages.

5 Claims, 3 Drawing Figures

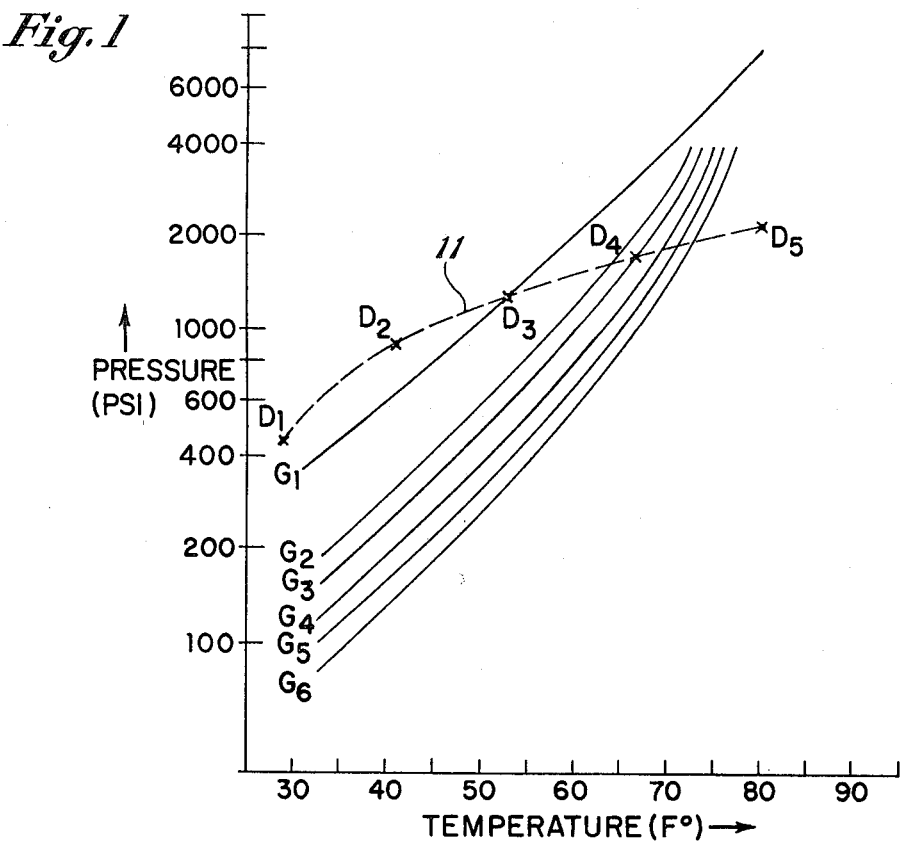
*Fig.1*
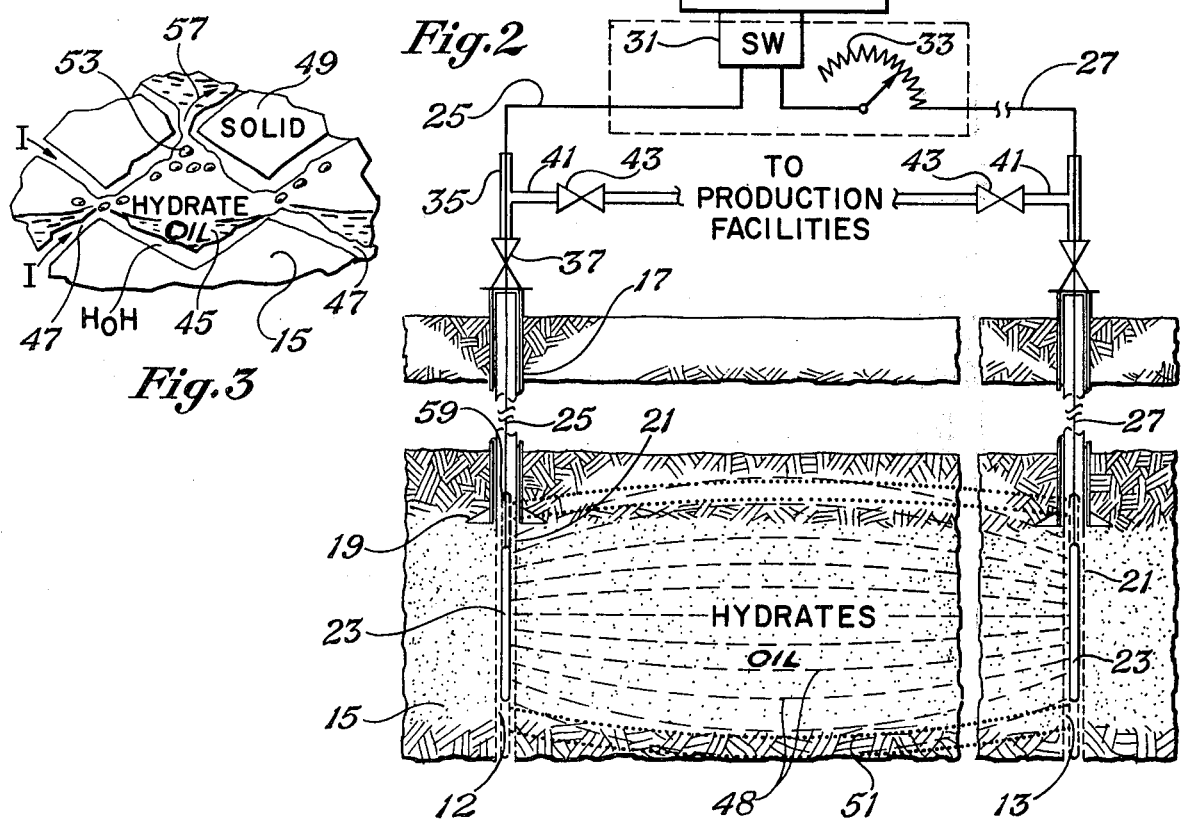
*Fig.2*
*Fig.3*

METHOD OF PRODUCING OIL FROM A SUBTERRANEAN FORMATION

BACKGROUND OF THE INVENTION

1. Field of the Invention

This invention relates to a method of producing oil from a subterranean formation. More particularly, this invention relates to a method of improving oil production from a subterranean formation in which the oil is either trapped in a pore by a blocked passageway, is a relatively nonmobile "dead" oil, or both.

2. Description of the Prior Art

Very few fields of technology have so rewarded workable innovation as the recovery of hydrocarbons from subterranean formations. Consequently, there have been many imaginative methods and apparatus proposed for production of hydrocarbons from subterranean formations. Many of the proposed methods have been expensive and unworkable; but many have increased recovery of hydrocarbons from subterranean formations and have benefited mankind.

With the advent of the increasing value of hydrocarbons, the volumes of hydrocarbons left in the subterranean formation have constituted increasing incentive for innovative methods for better recovery. Despite the application of the best known technology, one of the potential problems that has recently been recognized, particularly in the cold shallow formations in the arctic regions of the earth, are formations that contain hydrocarbons but produce the hydrocarbons at a lower rate than desirable on drill stem tests or the like. Such reservoirs appear to contain oil with much less solution gas associated with it than normally expected. In some cases the oil appears to contain little or no solution gas and seems in effect to be a "dead" oil, i.e., is unsaturated with respect to the gas.

Heretofore, it has been known that hydrates can form from hydrocarbon gas in the free gaseous phase in contact with water. However, recent studies have unexpectedly shown that water in contact with oil that is undersaturated with such gas will extract from said oil gas that is in solution with said oil and form a hydrate with the thus extracted gas.

SUMMARY OF THE INVENTION

Accordingly, it is an object of this invention to provide a method of improving the production of oil from subterranean formations.

It is a further object of this invention to provide a method of increasing the production rate of oil from subterranean formations that heretofore have had less than desirable producing rates.

Specifically, it is an object of this invention to render mobile, or more mobile, relatively immobilized oil in a subterranean formation and produce the oil to the surface.

These and other objects will become apparent from the descriptive matter hereinafter, particularly when taken in conjunction with the appended drawings.

In accordance with this invention, oil production rate is increased from subterranean formations. First, a plurality of at least two wells extending from the surface into the subterranean formation are completed in the formation. The subterranean formation is selected for completion if its temperature and pressure relationships are such that gas hydrates can form. Specifically, some or all of the solution gas is selectively extracted from the oil and tied up by formation of hydrates in combination with the connate water in the formation. The hydrates can block passageways through the formation interstices and prevent flow therethrough to further inhibit production of oil. In the next step in the process, the hydrates are melted in the subterranean formation to free the solution gas in situ. The melting of hydrates includes the step of heating the subterranean formation by electrical conductivity, or passage of a predetermined electrical current, from one of the wells to the other. The melting of the hydrates unblocks the passageways through the formation; beginning at the wells where there is greatest current density and moving outwardly in the formation. At least some of the gas that is freed by melting the hydrates is re-dissolved in the oil in situ to reduce the oil viscosity so that the oil flows more readily through the subterranean formation to a well. In the case of a dead oil, the re-dissolved gas converts the dead oil to a live oil. The live oil that is produced by re-dissolving of the solution gas freed by melting the hydrates is, in turn, produced from the subterranean formation to the surface via the wells.

Preferably, the live oil containing the solution gas is produced simultaneously with melting of the hydrates so as to reduce the pressure and, consequently, reduce the equilibrium temperature at which the hydrates can be melted.

BRIEF DESCRIPTION OF THE DRAWINGS

FIG. 1 is a graph of the pressure-temperature relationships defining hydrate forming properties that allow connate water to selectively extract solution gas from an oil and freeze, or combine with it, to form the hydrates; the graph having the depth of known shallow, cold formations imposed thereon in dashed lines.

FIG. 2 is a side elevational view, partly schematic and partly in section, illustrating one embodiment of this invention.

FIG. 3 is a conceptualized microscopic section depicting the production phenomena in the interstices of the subterranean formation in accordance with the embodiment of FIG. 2.

DESCRIPTION OF PREFERRED EMBODIMENTS

Many of the subterranean formations; particularly, those at relatively shallow depths in cold regions of the earth; have pressure-temperature characteristics that are conducive to tying up hydrocarbon gas, such as methane, natural gas and the like, in the form of hydrates. Under such hydrate forming conditions, the connate water of the subterranean formation forms hydrates with any free gas or with any gas in solution in oil. Consequently, the oil which exists in equilibrium with the free gas or oil which contains only solution gas within the formation is denuded of its solution gas, or has at least a part of its solution gas extracted. That solution gas is, in turn, tied up in the form of hydrates and further solution gas is extracted from the oil. Consequently, over a period of time, the oil becomes a more viscous oil with less solution gas and in some cases could be completely denuded of its solution gas to become a "dead" oil.

Specifically, tests have indicated that for methane hydrate, the chemical formulation is $CH_4 \cdot 6H_2O$; that is six molecules of water are crystallized with one molecule of methane. Therefore, one barrel of water (19.4 mols) will hydrate at 3.23 mols of methane, equivalent to about 1,230 standard cubic feet (SCF). The value is not substantially different for solution gases containing small amounts of other components, such as ethane and propane. Unsaturated crude oils (having no free gas phase present) typically under reservoir conditions will contain in solution less gas than about 0.15 SCF per barrel per pound per square inch (psi) pressure existing in the reservoir. For example, at a reservoir pressure of 2,000 psi, the typical crude oil will contain less than 300 SCF of gas in solution per barrel of oil. Since for the typical oil reservoir about ½ barrel of connate water is associated with each barrel of oil and one barrel of water will hydrate about 1,200 SCF gas, then the typical unsaturated oil reservoir existing in conditions where hydrates will form will be denuded of methane and at least partially denuded of ethane, propane and butane. The mobile oil phase in such a reservoir would have in place higher viscosity and lower gravity than it would otherwise have and would be essentially a "dead" oil.

The more viscous dead oil flows more difficultly through the subterranean formation because of its higher viscosity. Furthermore, the formation of the hydrates tends to form crystals that block the passageways and isolate the pores of the subterranean formation and any oil contained therewithin. Thus, the oil becomes less mobile in the subterranean formation. Furthermore, the gas is tied up as hydrate with the formation water and will not be produced. For example, FIG. 1 illustrates via dashed line 11 pressure-temperature characteristics of shallow formations in one area of an arctic region of the earth, superimposed upon a pressure-temperature relationship display for the formation of hydrates. Specifically, the temperature varies with the formation depth below the surface approximately according to the Equation I:

$$T = 15 + 0.013 \, D \qquad \qquad I$$

where
T = temperature, °F
D = depth, feet (ft.)

In the same area formation pressure varies with depth approximately in the following manner:

$$P = 0.45 \, D \qquad \qquad II$$

where
P = pressure, pounds per square inch (psi)
D = depth, ft.

Eliminating depth, D, from equations I and II yields the following relation between pressure and temperature for the area:

$$T = 15 + 13/450P \qquad \qquad III$$

This relation is plotted on FIG. 1 as the dashed line 11.

As indicated, the solid curves on FIG. 1 show pressure-temperature equilibrium data for natural gas, or solution gas, hydrates. For a given gas gravity, if the locus of the pressure and temperature values for an oil-containing subterranean formation falls above the corresponding gas hydrate curve, then some or all of the gas associated with the oil in the formation exists as a hydrate. For example, if a reservoir containing oil and an associated gas of 0.6 gravity has a temperature of 55°F., some or all of the gas will exist as a hydrate if the formation fluid pressure is greater than 700 psi. From a consideration of FIG. 1, it is clear that oil reservoirs containing gas hydrate can exist in the area depicted by dashed line 11 at depths shallower than 3,000 to 4,500 feet, depending upon the gas gravity. The depths $D_1$, $D_2$, $D_3$, $D_4$, and $D_5$ represent incremental depths in thousands of feet of 1,000, 2,000, 3,000, 4,000, and 5,000, respectively, while the specific gravities $G_1$, $G_2$, $G_3$, $G_4$, $G_5$, and $G_6$ represent gas gravities of $G_1$-0.55, $G_2$-0.58, $G_3$-0.60, $G_4$-0.65, $G_5$-0.70, and $G_6$-0.8.

Referring to FIG. 2, a plurality of wells 12 and 13 are drilled into and completed within the subterranean formation 15. Each of the wells 12 and 13 have a string of casing 17 that is inserted in the drilled borehole and cemented in place with the usual foot 19. A perforate conduit 21 extends into the subterranean formation 15 adjacent the periphery of the wellbore drilled thereinto. Preferably, the perforate conduit 21 includes a lower electrically insulated conduit for constraining the electrical current flow to the subterranean formation 15 as much as practical. The perforate conduit 21 may be casing having the same or different diameter from casing 17, or it may be tubing inserted through the casing 17. As illustrated, the perforate conduit 21 comprises tubing large enough for insertion therethrough of the electrodes and electrical conductors; but small enough to facilitate production of the fluids therethrough as solution gas-laden oil is produced toward the surface. Specifically, as the pressure is reduced on such solution gas-laden oil, the solution gas tends to come out of solution and form bubbles that facilitate production of the oil and tend to keep liquid heads unloaded from the well.

Each of the wells 12 and 13 has an electrode 23. Respective electrodes 23 are connected via electrical conductors 25 and 27 with surface equipment 28 and a source of electrical current, illustrated as alternating current (AC) source 29. The electrical conductors 25 and 27 are insulated between the electrodes 23 and the surface equipment 28. The surface equipment 28 includes suitable controls that are employed to effect the predetermined current flow. For example, a switch (SW) 31 and voltage control means, such as rheostat 33, are illustrated for controlling the duration and magnitude of the current flow between the electrodes 23 in the wells 12 and 13 by way of the subterranean formation 15. It is preferred that the alternating current source 29 be adjusted to provide the correct voltage for effecting the desired, or predetermined, current flow through the subterranean formation 15 without requiring much power loss in surface control equipment, exemplified by rheostat 33. The respective electrical conductors 25 and 27 are emplaced in their respective wells 12 and 13 with conventional means. As illustrated, they are run through lubricators 35 in order to allow alternate or simultaneous heating and production; without having to alter the surface accessories; such as, changing the configuration of the well head 37 with its valves and the like. The respective electrodes are also electrically connected with the subterranean formation 15; for example, electrically connected with a metallic conductive conduit 21 that is electrically connected to the formation 15, maintaining electrolyte intermediate the electrode 23 and the formation 15, or both.

As illustrated, the wells 12 and 13 are connected with respective production facilities by way of suitable respective conduit 41 including valves 43. The production facilities are those normally employed for handling oil and are not shown, since they are well known in the art. The production facilities range from simple separators for separating the respective streams of water, oil and gas; to more elaborate facilities. Ordinarily, the facilities will include a water knock-out for separating the water that is produced and gas-liquid separators for separating the gas from the oil. The water knock-out may be a heater-treater; particularly, if there are emulsion problems. The gas stream may have glycol injectors or the like for preventing formation of hydrates in long flow lines through the cold terrain; and separators for separating out the glycol, as well as treatment facilities for separating any liquefiable constituents from the gas stream. Any such liquid hydrocarbons, or liquefiable constituents, may be separated by lowering the temperature of the gas or through simple gas-liquid separators. The liquid hydrocarbons may be stored in pressurized tanks, such as for propane or LPG or in conventional stock tanks for higher boiling liquids similar to the oil. If desired, of course, the production lines may comprise multiple phase gathering lines over long distances to central production and storage facilities. Since these production and processing facilities are well known and do not, per se, form a part of this invention, they are not described in detail herein.

OPERATION

In operation, the wells 12 and 13 are completed in the subterranean formation 15 in accordance with conventional technology. Specifically, boreholes are drilled, at the desired distances and patterning, from the surface into the subterranean formation 15. Thereafter, the casing 17 is set into the formation to the desired depth. As illustrated, the casing 17 may comprise a surface string that is cemented into place immediately above the subterranean formation 15. Thereafter, the string of tubing, including an insulated perforate conduit 21, is emplaced in the respective boreholes and completed in accordance with the desired construction. For example, perforate conduit 21 may have its foot cemented in place or it may be installed with a gravel pack or the like to allow for expansion and contraction and still secure the desired productivity.

In any event, the electrodes 23 are thereafter placed in the respective wells 12 and 13. The formation 15 may range in thickness from only a few feet to as much as 50 or 100 or more feet thick. The electrodes will have commensurate length ranging from a few feet to 50 or 100 or more feet in length. The electrodes 23 are continuously conductive along their length and are electrically connected with the subterranean formation 15 as described hereinbefore and with the respective electrical conductors 25 and 27 by conventional techniques. For example, the electrodes 23 may be of copper-based alloy and may be connected with copper-based conductors 25 and 27 by suitable copper-based electrical connectors. Thereafter, the alternating current source 29 is connected with the conductors 25 and 27 by way of the surface control equipment, illustrated simply as switch 31 and rheostat 33. If the desired current densities are obtainable without the use of the rheostat, it is set on zero resistance position to obtain the desired current flow between the wells. Since there will be a high current density immediately adjacent each of the electrodes 23, the temperature will tend to increase more rapidly in this area. The current that flows through the formation 15 to heat the formation, the oil 45 and the hydrates 46, FIG. 3, frequently depends on the connate water envelopes 47 surrounding the sand grains 49 or the like. Accordingly, the temperatures in the regions of highest current densities; for example, in the regions immediately about and adjoining the wells 12 and 13; must not be so high as to cause evaporation of the water envelopes 47 at the pressure that is sustainable by the overburden. Expressed otherwise, the predetermined electrical current is maintained low enough to prevent drying of the subterranean formation 15 around the wells 12 and 13. Advantage is taken of the fact that the water from the melting hydrates tends to migrate with the oil, containing the solution gas therein, toward the production well and minimize the drying problem. It may be desirable, however, to periodically interrupt the flow of current and inject a small amount of electrolyte around each of the wells in order to keep the conductivity high in this region if conductivity tends to be reduced with the influx of water from the melting hydrates; for example, if the water did not pick up sufficient salts to maintain the conductivity high.

The electrical current will flow primarily through the subterranean formation 15 as shown by lines 48 when the electrodes 23 are emplaced therewithin, although some of the electrical current will flow through contiguous formations, such as the impermeable shales 51, FIG. 1, above and below the formation 15. The voltage and current flow are adjusted to effect the desired gradual increase in temperature of the formation 15, the oil, and the hydrates 45 therewithin without overheating locally at the points of greatest current density, as indicated hereinbefore. For example, the current may run from a few hundred to 1,000 or more amperes at the voltage drop between the electrodes 23 in the wells 12 and 13. This voltage drop may run from a few hundred volts to as much as 1,000 or more volts.

In any event, the pre-heating of the formation the oil and the hydrates is continued until the formation, the oil and the hydrates reach the equilibrium temperature at which the hydrates begin to melt at the pressure of the formation 15. The temperature tends to remain constant at the melting point of the hydrates. Gas, illustrated as bubbles 53, FIG. 3, is freed from the hydrates. As the gas is freed, initially adjacent the wells 12 and 13 where the greatest current density is effected, there is a tendency for the pressure to increase. Consequently, the gas is redissolved, or forced into solution by the pressure, in the oil. This converts the oil from a dead oil to a less viscous live oil that flows more readily through the interstices and interconnecting passageways in the subterranean formation. Moreover, as indicated hereinbefore, the melting of the hydrates also tends to unblock the small passageways interconnecting the respective pores and interstices in the formation and allows the more flowable, less viscous live oil to flow through the formation to be produced at the respective wells 12 and 13. The wells 12 and 13 are opened at their respective well heads for production of the live oil containing the solution gas. Frequently, the pressures that exist in the subterranean formation will be great enough to effect production of the oil to the surface without auxiliary pumping equipment. If desired, however, auxiliary pumping equipment may be employed. The auxiliary pumping equipment may take the form of downhole or surface equipment per se, or auxiliary equipment, such as gas lift valves where a supply of natural gas at the surface is plentiful. As illustrated, the pressure effected by liberation of the gas in attempting to put it into solution in the oil is adequate to produce the live oil to the surface and no auxiliary pumping equipment is illustrated. Such auxiliary pumping equipment is conventional and does not need to be described herein.

In the event that the well heads were shut in and the oil containing the solution gas were not produced simultaneously with the heating, the pressure increase in the formation would increase the pressure at which the hydrates melt. Consequently, absent the simultaneous production of the oil and solution gas, the amount of sensible heat that would have to be supplied to the formation, oil and hydrates to raise their temperature to the melting temperature of the hydrates would have to be increased.

Fortunately, the hydrates are melted and the oil converted to a live oil adjacent the wells 12 and 13 first. Thus, production of the live oil increases the permeability adjacent the wellbore to facilitate production of the live oil from further out in the formation after its solution gas has been freed from the molten, or decomposed, hydrates. This fortuitous advantage effected by electrical conduction heating in situ, facilitates production of the live oil and keeps the pressure in the formation as low as possible in order to keep the temperature at which the hydrates melt as low as possible. As indicated hereinbefore, it is also fortitutous that the melting hydrates increase the connate water saturation. The connate water formed by melting of the hydrates picks up soluble salts, if any were knocked out of solution by the hydrate formation. The resulting electrolyte, in turn, increases the conductivity of the formation about the respective wells to facilitate electrical conduction in the region of highest current densities and facilitates melting the hydrates farther out in the formation more remote from the wells. As illustrated in FIG. 3, the gas that is freed may migrate into existing oil at its in situ location and the resulting live oil will flow under the existing pressure gradient from its in situ location to the respective well. For example, the live oil may migrate to the right, as indicated by the arrow 57 if the pressure gradient is toward the well to the right in FIG. 3.

To investigate economic feasibility, the theoretical calculations can be made using conventional computer-based heat transfer formulae for heating subterranean formations containing the oil and the hydrates. In a conventional formation, the passage of electrical current will cause the formation, oil and hydrates to be heated directly. Once the temperature at which the hydrates melt is reached in the formation 15, the hydrates begin to melt to liberate the gas. The gas begins to increase the pressure locally and begins to be re-dissolved in the oil, as indicated hereinbefore. The live oil can be produced through the wells to the surface. On a microscopic scale, the local increase in pressure because of the gas liberation may effect local elevation of the temperature at which the hydrate melts, but this temperature will go back toward the averaged equilibrium temperature as the gas is dissolved into the oil and the live oil migrates toward the wellbore and is produced.

The foregoing procedure has been described for most formations in which a connate water envelope 47 exists to conduct the electrical current, indicated by the current arrow I, FIG. 3. There may exist formations in which all of the water is tied up in hydrates. In such formations, there would be very little conductivity and very little heating from an electrical current flow. With such formations, it becomes necessary to flow electrical current through the overlying and underlying strata, such as strata 51. Consequently, longer electrodes may be employed, as illustrated in dotted lines 59, FIG. 2, such that the respective electrodes 23 extend into the underlying strata 51 from the formation 15 and the overlying strata. Initially, the electrical conduction and heating is effected in the underlying and overlying strata and the heat transferred by heat conduction into the formation 15 and the oil and hydrates therewithin. As the hydrates 45 are melted, however, water is freed along with the solution gas. This water tends to form the connate water envelopes 47, pick up soluble salts, and increase the conductivity within the formation 15. With time, the temperature increase of the oil, hydrates and formation 15 increases to achieve a more generalized connate water distribution. Thereafter, the primary electrical conduction and heating will be effected in the subterranean formation 15 and the operation carried out as has been described hereinbefore. The longer electrodes, illustrated by dotted line 59, are not necessary if the electrolyte is maintained in the respective wells and in contact with the electrode 23 and the strata above and below the formation 15, since the electrolyte will have the same effect as the longer electrode 23.

It is realized that there may be some hazard or electrical shock if conductive fluids, such as salt water, or other electrolytes, are produced simultaneously with the passage of electrical current through the formation. The hazard of electrical shock is not insurmountable, however, and careful insulation and operation can prevent hazard to operating personnel and allow concurrent electrical conduction and heating and production of the live oil and other wellbore fluids to the surface.

From the foregoing, it can be seen that by proper patterning of the wells and employing pre-heating by use of electrical energy to mobilize the immobilized oil; as by heating the hydrates to free the gas and the water and redissolving the gas in the oil and unblocking the passageways interconnecting the pores and the interstices in the formation, the in situ oil in the predetermined pattern can be produced, via wells completed in the formation, to the surface by an engineeringly feasible process.

EXAMPLE

The following example is given to demonstrate how a typical process is carried out as described hereinbefore with respect to FIG. 2. The example also gives the engineer a feel for the dynamics that will develop in the project. The exemplified subterranean formation 15 has a depth of 2,000 feet with an averaged pressure of 900 psi and a temperature of 41°F. The formation 15 has an averaged thickness of about 30 feet and a porosity of about 30 percent. It has adequate permeability to produce the live oil formed by dissolution of the solution gas after it has been liberated by melting of the hydrates without significant increases in pressure within the subterranean formation 15. The formation 15 has a 0.363 saturation of free water, a 0.105 saturation of hydrate, and a 0.532 saturation of oil. Since the oil is dead and immobilized by hydrates blocking the passageways in the formation, the formation produces at a low rate on drill stem tests. The gas when liberated has a gravity of 0.65. The hydrate has a gravity of 0.9. The oil has a gravity of 30° API (Americal Petroleum Institute). The amount of gas present as hydrate is about 101 SCF per barrel pore space, with no free gas present in the formation 15. The heat capacity of the composite subterranean formation 15 is about 30 British Thermal Units per degree Fahrenheit per cubic foot (BTU/°F/ft.$^3$). The heat of hydrate decomposition, equivalent to the latent heat of fusion in normal ice, is 243 BTU's per pound (lb.). By reference to a detailed figure like FIG. 1, it can be seen that to thermally decompose the hydrate containing the solution gas, it is necessary first to heat the formation 15, the oil and the hydrate therewithin to approximately 61.5°F to bring it to the equilibrium curve for 0.65 gravity gas. If there were free gas or other, mobile fluids in the formation, the pressure could be reduced by production of these fluids to reduce the temperature at which the hydrate would melt, or decompose. This invention can employ any desirable combination of supplying heat to the formation, oil and hydrate and/or reducing the pressure within the formation to melt the hydrate. After the system is brought to a temperature equivalent to the equilibrium curve, heat is be supplied to the hydrate to melt it. The following table summarizes pertinent information.

TABLE

Heat required to raise formation from 41°F to 61.5°F
$= 20.5 \times 30$
$= 615$ BTU/ft.$^3$ of formation
$= 615 \times 30 \times 43560$
$= 8.05 \times 10^8$ BTU/acre Amount of hydrate present per cubic foot of formation
$= 0.30 \times 0.105 \times 0.9 \times 62.4$
$= 1.77$ lb./ft.$^3$ Heat required to decompose hydrate
$= 243 \times 1.77 = 430$ BTU/ft.$^3$
$= 430 \times 30 \times 43560$
$= 5.61 \times 10^8$ BTU/acre Total heat required to liberate gas
$= 5.61 \times 10^8 + 8.05 \times 10^8$
$= 1.37 \times 10^9$ BTU/acre Volume of oil per pore space (saturation) before melting of hydrate
$= .532$ bbl/bbl (barrel)

Volume of oil after solution of hydrated gas
$= 0.57$ bbl/bbl pore space

Formation volume factor (ratio of reservoir oil volume to produced stock tank oil volume)

$= \dfrac{.57}{.532} = 1.07$

Solution gas-oil ratio $= \dfrac{101}{.532} = 190$ SCF/ stock tank barrel (STB)

Volume change:

gas density $= 0.65 \times 0.076 = 0.0495$ lb/SCF
1 bbl water + 1230 SCF gas $= 350$ lb water + 60.7 lb gas
$= 411$ lb hydrate/bbl water
hydrate density $= (0.9)(350) = 315$ lb/bbl hydrate volume of water per volume hydrate $= \dfrac{315}{411} = 0.765$ bbl water per bbl hydrate Percent change in liquid volume per pore volume upon decomposition
$= 7$ percent (%) oil volume change
$- (0.105$ bbl hydrate/bbl pore volume)

$\times (1 - 0.765$ bbl water/bbl hydrate$) \times 100$
$= 4.5\%$ increase

This change in volume would lead to some pressure increase by the fluid in the formation so that either the reservoir should be produced during heating or raised to a higher temperature to reach the equilibrium temperature and bring the hydrate to the equilibrium curve.

From the foregoing descriptive matter it can be seen that this invention provides a novel and unobvious way of increasing the oil producing rate and of recovering gas from subterranean formations that heretofore would not have been produced. Moreover, this invention achieves all of the objects delineated hereinbefore.

Having thus described the invention it will be understood that such description has been given by way of illustration and example and not by way of limitation, reference for the latter purpose being had to the appended claims.

What is claimed is:

1. A method of increasing the oil production rate from a subterranean oil bearing formation which contains solid gas hydrate comprising melting said hydrates in said formation to free natural gas in situ; said melting of said hydrate including the step of heating said formation and said hydrate; said heating being effected by electrical conduction comprising passing through said formation an electrical current of sufficient magnitude to heat said formation and said hydrates sufficiently to effect melting of said hydrate in situ.

2. The method of claim 1 wherein said melting of said hydrate includes the steps of substantially simultaneously:
   a. producing oil and gas to the surface of the earth to lower the pressure in said subterranean formation below what it would normally be;
   b. supplying heat to said formation, oil, and hydrate via electrical conduction to raise the temperature thereof to about the equilibrium temperature at which said hydrate melts; and
   c. supplying by said electrical conduction sufficient heat to melt at least part of said hydrate and thereby free some gas therefrom.

3. The method of claim 1 wherein said subterranean formation initially has essentially no free connate water and said electrical current initially is primarily conducted through adjacent conductive formations to supply heat thereto, said heat being conducted into said subterranean formation containing said hydrate to melt said hydrate and create some free connate water and render said subterranean formation more electrically conductive.

4. The method of claim 1 wherein said subterranean formation has a low electrical conductivity and said electrical current is primarily conducted through adjacent conductive formations to supply heat thereto, said heat being conducted into said subterranean formation containing said hydrate.

5. A method of improving the production of oil from at least one subterranean formation comprising the steps of:
   a. drilling at least two spaced apart wells from the surface of the earth into a subterranean formation that contains hydrate, said hydrate being formed by a combination of water and gas from within said formation; said formation also containing an unsaturated oil;

b. melting said hydrate in said subterranean formation to free gas in situ from said hydrate; said melting of said hydrate including the step of heating said subterranean formation and said hydrate by electrical conduction comprising passing from one of said wells to another of said wells an electrical current of sufficient magnitude to heat said formation; and c. producing oil and gas to the earth's surface.

* * * * *